United States Patent
Lee et al.

(10) Patent No.: US 6,924,909 B2
(45) Date of Patent: Aug. 2, 2005

(54) HIGH-SPEED SCANNER HAVING IMAGE PROCESSING FOR IMPROVING THE COLOR REPRODUCTION AND VISUAL APPEARANCE THEREOF

(75) Inventors: Yongchun Lee, Rochester, NY (US); George O. Simmons, Rochester, NY (US); James R. Pamper, Lima, NY (US); Wenjin Zhou, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 860 days.

(21) Appl. No.: 09/789,103

(22) Filed: Feb. 20, 2001

(65) Prior Publication Data

US 2002/0113983 A1 Aug. 22, 2002

(51) Int. Cl.[7] ............................... G06F 15/00; G06K 1/00
(52) U.S. Cl. .......................... 358/1.9; 358/1.9; 358/2.1; 358/505; 358/425; 358/518; 370/329
(58) Field of Search ........................ 358/1.9, 2.1, 505, 358/425, 518; 370/329

(56) References Cited

U.S. PATENT DOCUMENTS

| | | | | |
|---|---|---|---|---|
| 4,464,677 A | * | 8/1984 | Kuhn et al. | 358/518 |
| 5,339,172 A | * | 8/1994 | Robinson | 358/462 |
| 5,583,659 A | * | 12/1996 | Lee et al. | 358/3.13 |
| 5,903,360 A | * | 5/1999 | Honma et al. | 358/450 |
| 5,926,292 A | * | 7/1999 | Ishikawa et al. | 358/534 |
| 6,097,510 A | * | 8/2000 | Kanno et al. | 358/518 |
| 6,268,939 B1 | * | 7/2001 | Klassen et al. | 358/518 |
| 6,426,809 B1 | * | 7/2002 | Hayashi et al. | 358/529 |

* cited by examiner

*Primary Examiner*—Kimberly Williams
*Assistant Examiner*—Michael Burleson
(74) *Attorney, Agent, or Firm*—Peyton C. Watkins

(57) ABSTRACT

A scanner for digitizing a document includes a digitizer for digitizing the document into a first color space; a circuit for converting the digitized data into a second color space having a luminance channel and two chrominance channels; a multiplexer having text, approximate actual color of a uniform area and a predetermined color as input for selecting either the text, approximate actual color or the predetermined color as outputs; and multiplexer control input which determines which of the outputs will be selected as actual output based on a uniform area of the document.

8 Claims, 2 Drawing Sheets

HIGH-SPEED SCANNER HAVING IMAGE PROCESSING FOR IMPROVING THE COLOR REPRODUCTION AND VISUAL APPEARANCE THEREOF

FIELD OF THE INVENTION

The invention relates generally to the field of high-speed, document scanners, and more particularly, to a method and apparatus for improving the color reproduction and visual appearance of the scanned documents.

BACKGROUND OF THE INVENTION

High-speed, document scanners are used to scan documents into a digital file for efficient storage of the documents, typically commercial-type documents, for later retrieval. These scanners typically includes a plurality of mechanical and electro-mechanical components for passing the document therethrough during the scanning process, as is well-known in the art. Such apparatuses, however, can cause undesired artifacts in the digital file representing the scanned document due to bending of the documents during processing, undesirable light reflection angles and the like. To reduce these artifacts, such high-speed scanners typically include standard image processing which processes the digital file for producing higher quality digital files.

Although the present method and apparatus for scanning documents is satisfactory, they include drawbacks. The standard image processing, color correction produces lines and/or text which are lighter than desired and a background which is aesthetically unpleasing and/or an inaccurate representation thereof. Therefore, a need exists for improved image processing in high-speed scanners which reduce or eliminate these undesirable artifacts

SUMMARY OF THE INVENTION

The present invention is directed to overcoming one or more of the problems set forth above. Briefly summarized, according to one aspect of the present invention, the invention resides in a scanner for digitizing a document comprising: (a) a digitizer for digitizing the document into a first color space; (b) a color space converter for converting the digitized data into a second color space having a luminance channel and two chrominance channels; (c) a multiplexer having text, approximate actual color of uniform area and a predetermined color as input for selecting either the text, approximate actual color or the predetermined color as outputs; and (d) multiplexer control input which determines which of the outputs will be selected as actual output based on a uniform area of the document.

It is an object of the present invention to provide a high-speed scanner that produces high-quality text and uniform areas having the actual color of the document, either white or some chromatic color.

It is a feature of the present invention to include a multiplexer that will output, either output-high-quality text or the actual color of the uniform area depending on the input from two control signals.

It is an advantage of the present invention to provide image processing for producing high-quality text and accurate color reproduction of uniform areas with a combination of compact integrated circuits.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment in hardware implementation, more particularly integrated circuits. However, those skilled in the art will readily recognize that the equivalent of such hardware may also be constructed in software.

Figure 1:
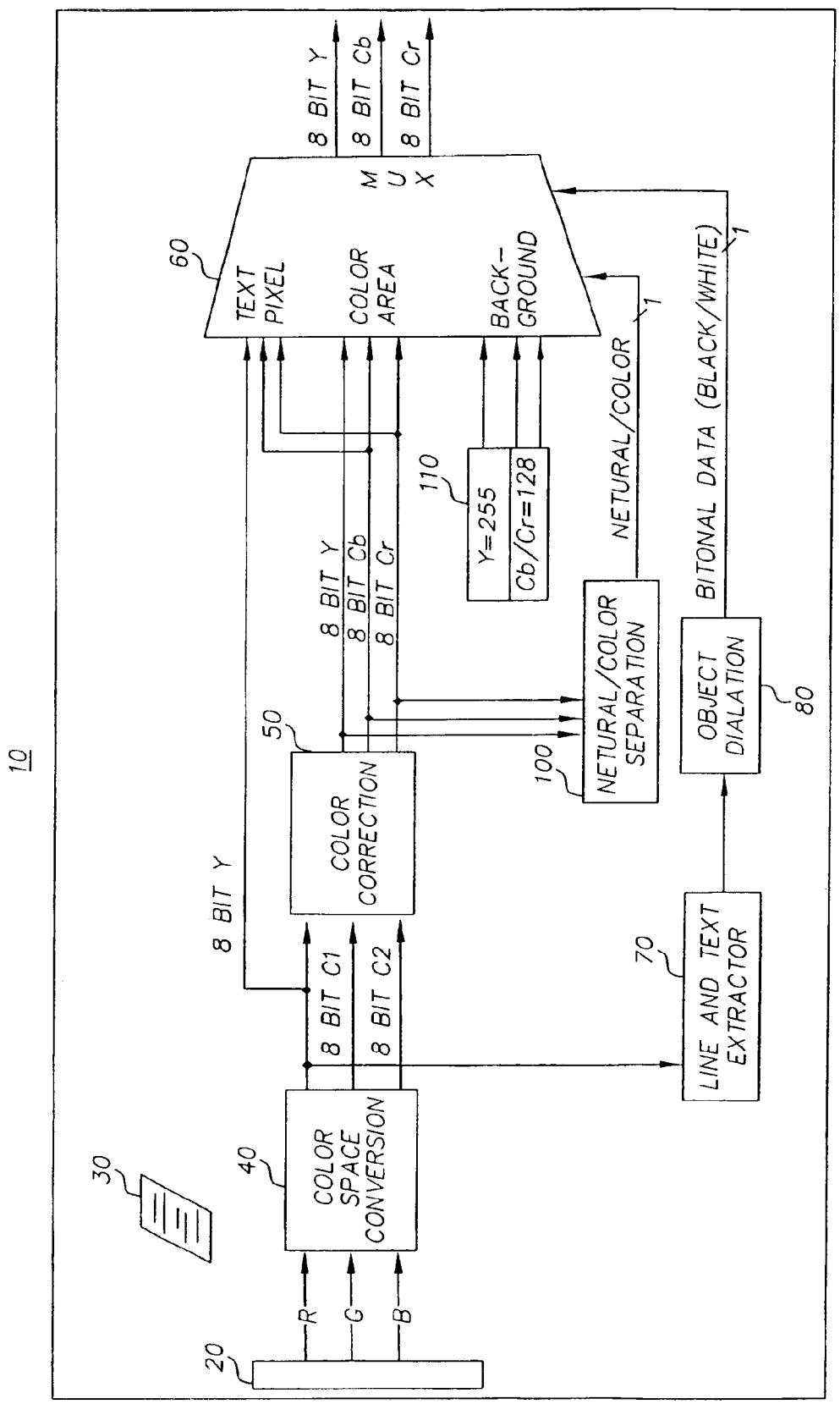
FIG. 1 is a schematic diagram of the improved image processing of the present invention.

Referring to FIG. 1, the present invention includes a high-speed scanner 10 having a digitizing device 20 for digitizing documents 30 scanned therethrough. The digital file representation of the scanned document 30 includes a plurality of digital color channels, typically red, green, and blue, representing the scanned document. The color channels are passed through a color conversion lookup table 40 for converting the red, green and blue signals into a color space having a luminance channel and two chrominance channels. In the preferred embodiment, the chrominance channels are preferably Cb and Cr. These color and luminance channels are then passed through a standard, color-correction lookup table 50 for processing the digital file through standard image processing algorithms. Such standard image processing algorithms are those as are in the prior art and will not be discussed in detail herein. These algorithms correct for, for example, the spectral sensitivity of the imaging sensor and light source, which results in enhancing the chrominance information and reducing the contrast of the luminance channel.

Figure 2:
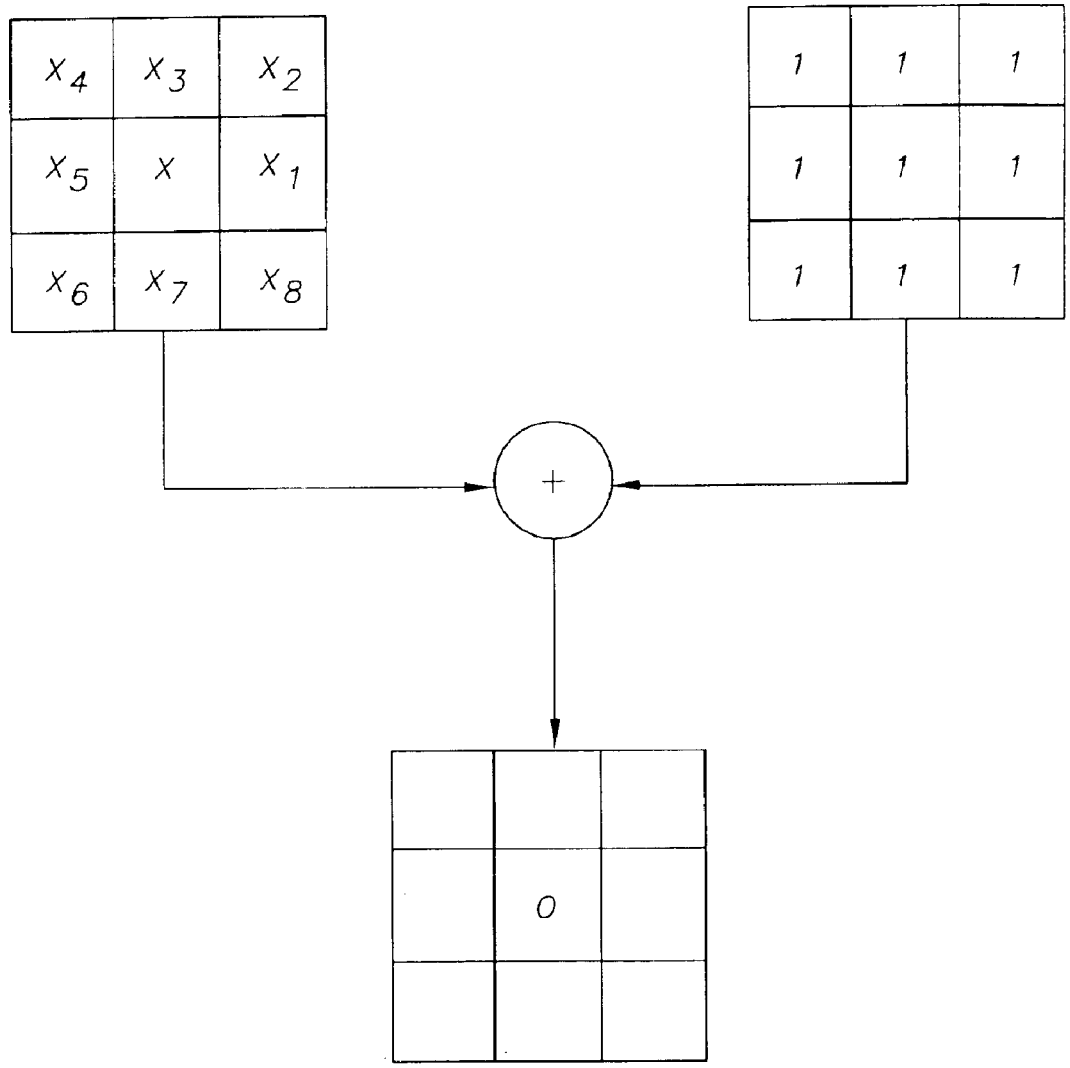
FIG. 2 is a detailed block diagram of an object dilation of FIG. 1.

The chrominance channels after color correction and the luminance channel before color correction are then passed as one of three inputs to a multiplexer 60. This signal represents the lines and/or text of the document 30. The luminance channel before color correction is also passed to a line and text extractor 70 that produces a bi-tonal or binary signal for extracting any line and/or text in the document 30. This line/text extractor 70 is well-known in the art, such as that described in U.S. Pat. No. 5,583,659, and will not be discussed in detail herein. The bi-tonal signals is then dialated by a 3×3 dilation integrated circuit 80 to expand the width of the characters clipped by thresholding during the line/text extraction process. Referring briefly to FIG. 2, assuming that the black pixel (indicating lines and/or text) is indicated with "1" and the white pixel (indicating uniform areas) is indicated with "0" in a binary image, the image dilation is to expand the region of black dots by a local neighborhood. The center pixel "o" at the output is set to "0" only when all neighboring pixels X1 in a 3×3 window, where I=1, 2, . . . 8, are matched with the 3×3 zero mask. Otherwise, the center pixel "o" "a" the output is indicated with a black pixel, "1." The output of the dilation is a signal having two code values; one code value representing the text, typically the code value 1, and the other code value representing the background, typically the code value zero. The signals then passed to the multiplexer as one of two control signals.

Referring back to FIG. 1, the luminance and two chrominance channels all after color correction are passed as another input to the multiplexer 60. This signal produces a signal representative of the actual color of uniform areas, which areas are typically of background areas.

As for the other control input, the chrominance channels and the luminance channel all after color correction are then passed to a neutral/color separation integrated circuit 100 for deciding whether the uniform area is white (neutral) or some chromatic color. A pixel is classified as neutral if $|C_1-128|<C_{th}$ and $|C_2-128|<C_{th}$, else it is classified as color.

Where the $C_1$ and $C_2$ are the two chromaticity values at the pixel of interest. The value "128" is the perfect neutral value. The $C_{th}$ is a threshold value for tolerance of noise variation in color capture. This signal is also passed as a control signal to the multiplexer 60.

The third input to the multiplexer 60 is of a predetermined color, preferably neutral in the present invention, which includes a luminance value of 255 and chrominance values of 128 and stored in memory 110. This signal is representative of a white background.

The operation of the multiplexer is as follows. First, the dilated signal from the 3×3 dilation 80 determines whether the multiplexer 60 will choose either text or a uniform area (eventually choosing either the approximate actual color of the uniform area or white, as described below, if the uniform area is chosen) as the output. If text is chosen, obviously the multiplexer 60 will output the text code values as the output for this particular pixel location. If the uniform area is chosen for this particular pixel location, the signal from the neutral/color separator integrated circuit 100 will determine whether white code vales, or the code values representative of the actual color the uniform area is chosen for this pixel location, as described hereinabove.

The multiplexer 60 then passes its output signal to any suitable storage media (not shown), such as electronic memory and the like. The media stores the entire digital representation of the document from the multiplexer along with any associative information suitable for query during retrieval. During query, the user will query a computer system having a plurality of digital representations of documents for retrieving the corresponding digital representation of the document associated with the query.

The invention has been described with reference to a preferred embodiment. However, it will be appreciated that variations and modifications can be effected by a person of ordinary skill in the art without departing from the scope of the invention.

PARTS LIST

10 High-speed scanner
20 Digitizing device
30 Digitizing document
40 Color conversion lookup table
50 Color-correction lookup table
60 Multiplexer
70 Line/text extractor
80 Dilation integrated circuit
100 Neutral/color separation integrated circuit
110 Memory

What is claimed is:

1. A scanner for digitizing a document comprising:
   (a) a digitizer for digitizing the document into a first color space;
   (b) a color space converter for converting the digitized data into a second color space having a luminance channel and two chrominance channels;
   (c) a multiplexer having text, approximate actual color of a uniform area and a predetermined color as input for selecting either the text, approximate actual color or the predetermined color as outputs; and
   (d) multiplexer control input which determines which of the outputs will be selected as actual output based on a uniform area of the document; wherein the multiplexer control input includes a first logic input having a line and/or text extractor for determining whether a pixel is text or an uniform area, and a second logic input for determining whether the uniform area is to be the approximate actual color or the predetermined color.

2. The scanner as in claim 1, wherein the predetermined color is white.

3. The scanner as in claim 1, wherein the first logic input further includes a dilation circuit for enlarging the extracted line and/or text.

4. The scanner as in claim 2, wherein the second logic input includes a threshold circuit for determining whether the uniform area is white or chromatic color.

5. A method for scanning and digitizing documents, the method comprising the steps of:
   (a) digitizing the document into a first color space;
   (b) converting the digitized data into a second color space having a luminance channel and two chrominance channels;
   (c) providing text, approximate actual color of uniform area and a predetermined color as multiplexed input, and providing multiplexed output as either the text, approximate actual color or the predetermined color as outputs; and
   (d) determining which of the outputs will be selected as actual output based on a uniform area of the document; wherein step (c) includes (e) determining by a line and/or text extractor whether a pixel is text or a uniform area, and (f) if the uniform area, determining whether the uniform area is to be the approximate actual color or the predetermined color.

6. The method as in claim 5, wherein step (c) includes providing white as the predetermined color.

7. The method as in claim 5, wherein step (e) includes further providing a dilation circuit for enlarging the extracted line and/or text.

8. The method as in claim 5, wherein step (e) includes providing a threshold circuit for determining whether the uniform area is white or chromatic color.

* * * * *